United States Patent [19]

Marks

[11] Patent Number: 4,685,244

[45] Date of Patent: Aug. 11, 1987

[54] ENTRAPMENT APPARATUS

[76] Inventor: Arthur E. Marks, 2736 Lincoln La., Wilmette, Ill. 60091

[21] Appl. No.: 878,120

[22] Filed: Jun. 25, 1986

[51] Int. Cl.$^4$ .............................................. A01M 1/14
[52] U.S. Cl. .......................................... 43/58; 43/114
[58] Field of Search ....................... 43/58, 60, 114, 136

[56] References Cited

U.S. PATENT DOCUMENTS

| 4,395,842 | 8/1983 | Margulies | 43/114 |
| 4,438,584 | 3/1984 | Baker | 43/58 |
| 4,630,391 | 12/1986 | Meyers | 43/58 |

FOREIGN PATENT DOCUMENTS

| 79225 | 5/1983 | European Pat. Off. | 43/60 |
| 3127234 | 1/1983 | Fed. Rep. of Germany | 43/60 |

Primary Examiner—Gene P. Crosby
Attorney, Agent, or Firm—Russell E. Hattis; Lawrence J. Bassuk

[57] ABSTRACT

A trap entangling vermin with adhesive material includes a pair of elongate ribs vacuum formed at central locations in the bottom wall of the tray carrying the adhesive material. The ribs are elongate and angled substantially at 45 degrees to the side walls positively to space apart the adhesive materials of two like traps placed in open faced relationship even when the traps are not in good registration. The ribs are hollow, opening to below the bottom wall, and have a uniform, substantially triangular shape along their length, with a radiused apex to increase the spot of contact between two engaging ribs.

21 Claims, 9 Drawing Figures

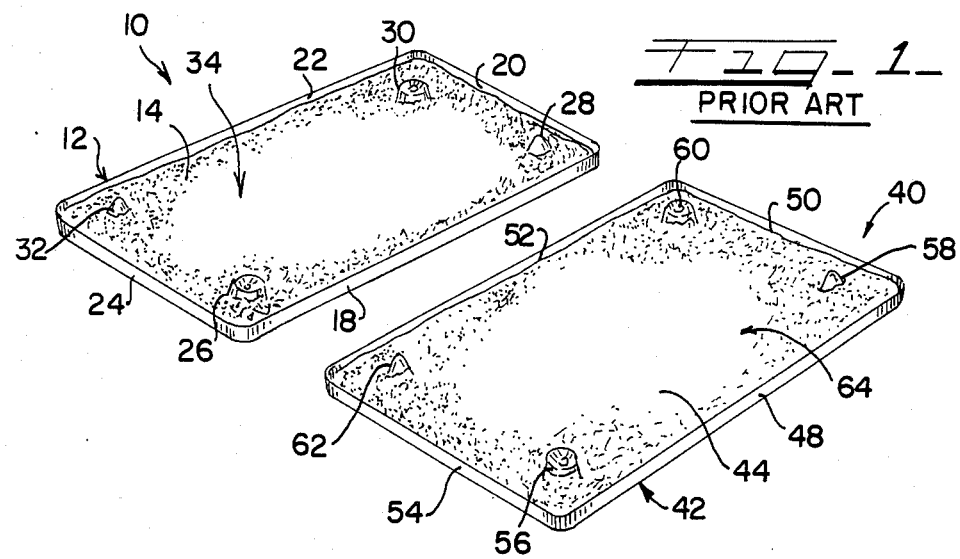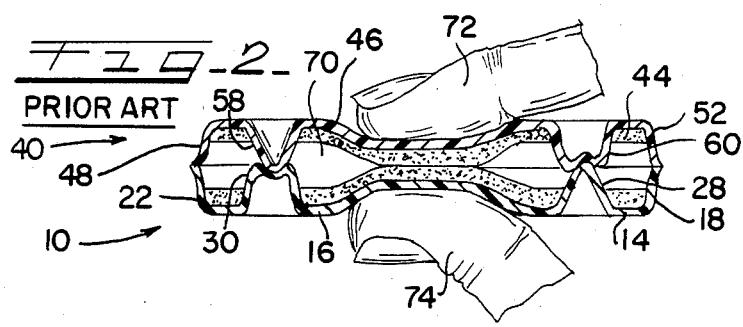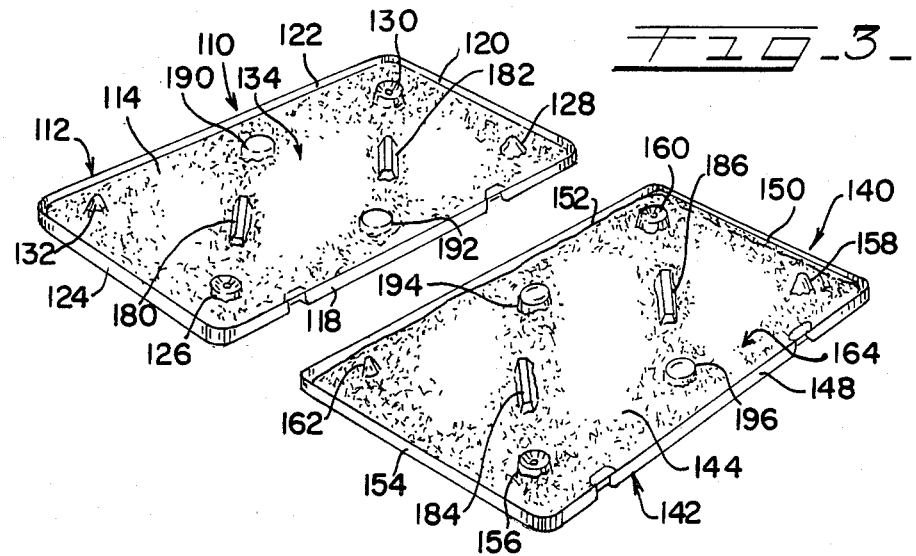

U.S. Patent   Aug. 11, 1987   Sheet 2 of 3   4,685,244
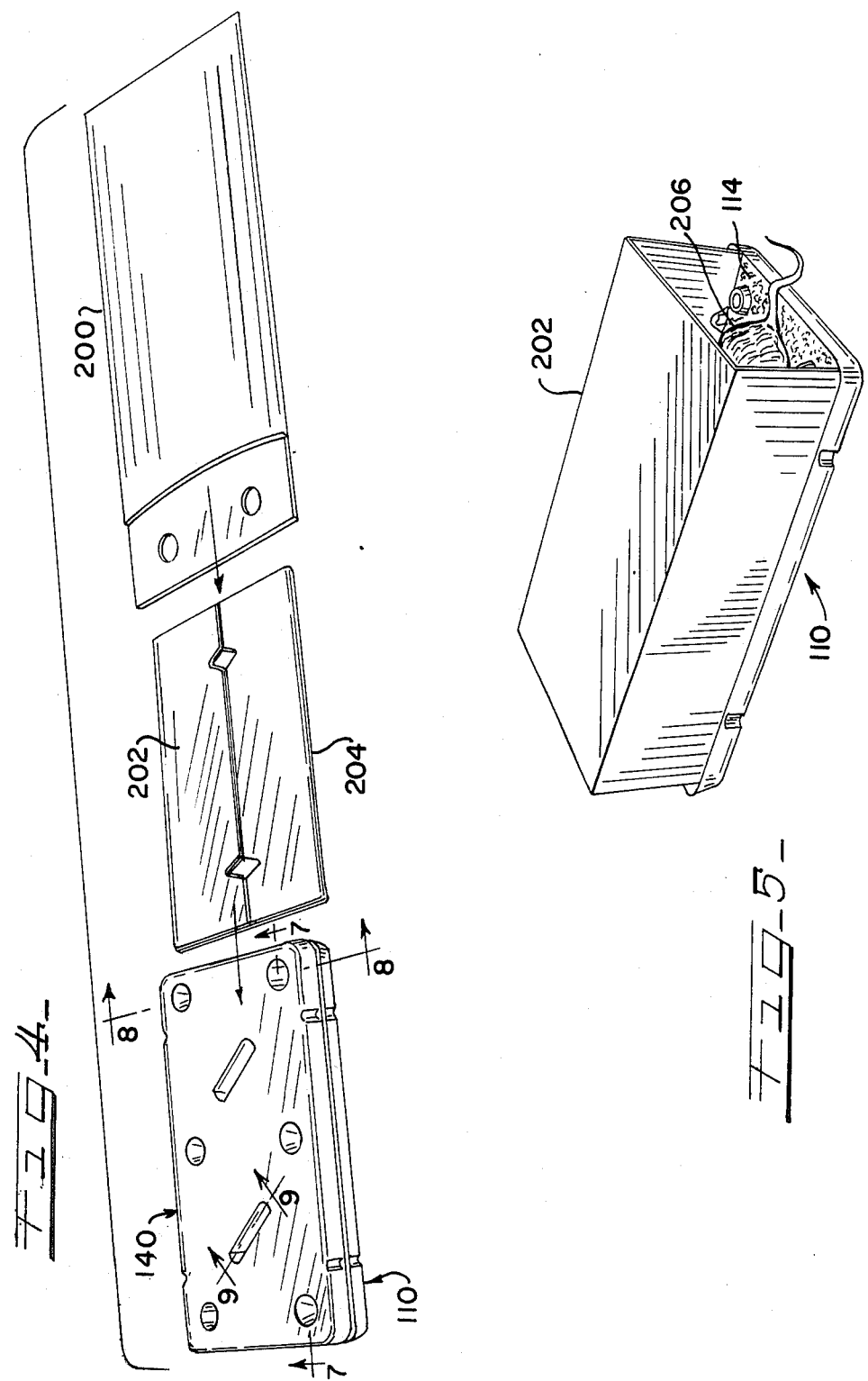

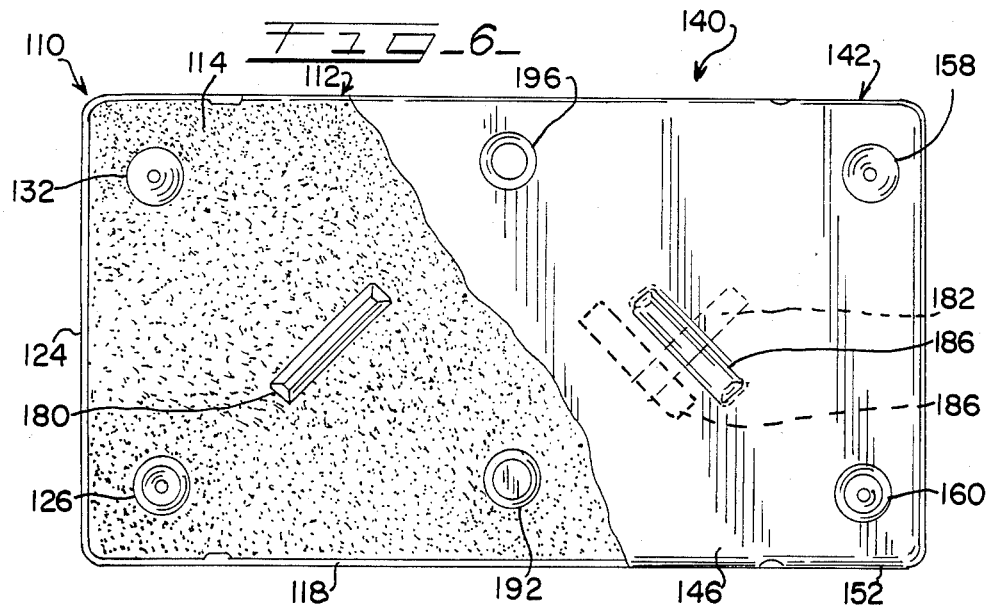
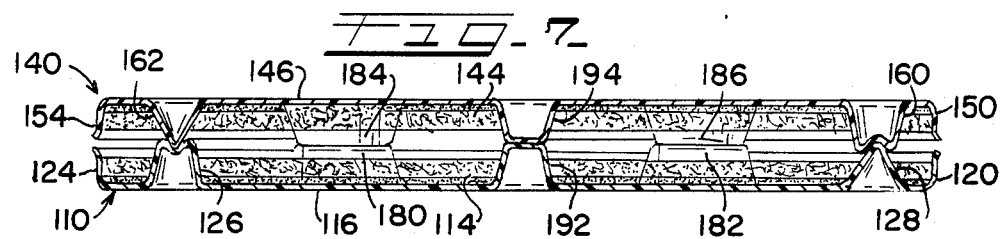
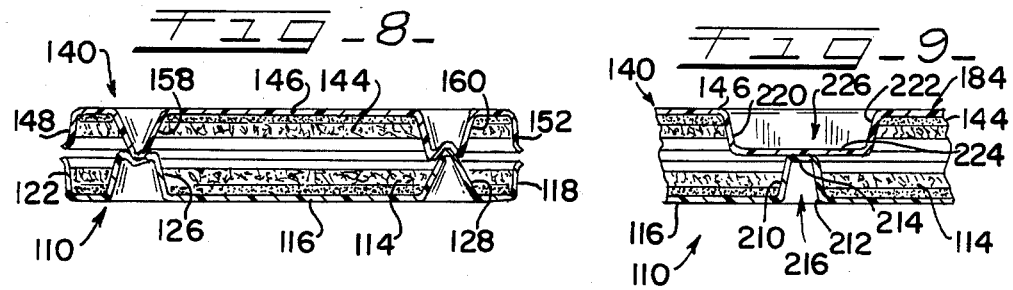
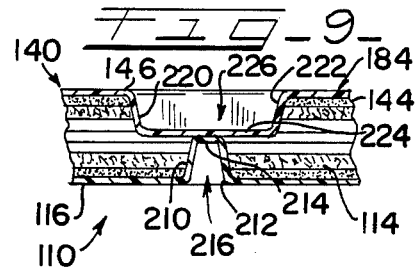

ENTRAPMENT APPARATUS

BACKGROUND OF THE INVENTION

This invention relates generally to vermin traps using adhesive material to hold the vermin, and particularly relates to such traps having open faces and in which two traps are arranged in facing relationship in one package for transport and sale.

Adhesive, non-toxic traps for vermin such as mice are known. They comprise a shallow, flat plastic tray containing a thick layer of pressure sensitive adhesive material. The tray is set in any desired location and any mouse stepping on the adhesive becomes entrapped or entangled therein. The tray then is removed and disposed of along with the entangled vermin. These traps use adhesive materials that are generally insensitive to normal heat variations in a room but adhere strongly to objects to which they come in contact. An example of such a trap is disclosed in U.S. Pat. No. 4,438,584.

A problem sometimes occurs with these traps during handling of the trays when they are removed from their packaging. Forces applied centrally to the two facing traps of adhesive materials in the noted packages, can bring into contact the normally spaced adhesive materials of each trap. This causes the adhesive materials of each tray to flow and stick to one another. These forces generally result from the unintended squeezing of the trays between the user's fingers upon removal of the confronting trays from the packaging.

Previously, this problem was addressed by providing confronting contacting pins on the trays periphery to minimize the compressibility of the trays. These pins did not maintain the necessary spacing in the centers of the trays. Auxiliary separate spacers were sometimes placed in the center of the confronting trays to prevent the compression of the trays. To my knowledge, there has not been provided the uniquely shaped spacer ribs to be described which are formed integrally with the trays referred to. The trays in which the adhesive materials are carried and spacers used therewith need to be reliable and as inexpensive as possible to be competitive in the market and because the user will ultimately throw them away after entrapping or entangling the vermin. The unique spacer rib structure to be described reliably and inexpensively minimizes the compressibility problem referred to. These trays typically are formed of vacuum formed sheet plastic material in inexpensive molds. The spacer rib structure referred to is formed by these molds in a manner where the rib structure and other portions of the tray can be made to loose tolerances and yet the spacer rib structure will always contact the spacer rib structure of a confronting tray made from the same mold.

SUMMARY OF THE INVENTION

The invention provides a unique centrally located spacer rib structure which is elongated and angled relative to the tray side walls. When two similar trays with such rib structures are placed in confronting relation, the elongated and angled ribs of the two trays will cross one another even when the trays are made to loose tolerances. This is to be compared with a spacer rib structure which is parallel to the tray sides or the use of spacer pins both of which require a more precise alignment of the trays and spacer ribs formed therein.

In particular, the preferred tray to carry a layer of adhesive material in forming a vermin trap has a bottom wall, four peripheral side walls and an open top face. The tray is preferably formed from a sheet of vacuum formed thermoplastic material, The side walls extend from the bottom wall to above the top surface of the adhesive material to effect the desired spacing. Additionally, there is one, and preferably two, elongate and angled ribs extending from the bottom wall to above the top surface of the adhesive material at points centrally located between the side walls.

Preferably, the two ribs are arranged at a 45 degree angle to the side walls and have a length approximately four times their base width. Two like trays, from the same or different tooling, arranged in facing relationship will thus have their ribs engage against one another at substantially right angles and support the bottom walls against forces applied centrally thereof. The angle of the ribs and their lengths ensures that the ribs of the two trays will engage one another even when made with the least expensive tooling and packaging procedures where the confronting trays are packaged or handled with the trays mis-aligned.

The shape of each rib preferably is of triangular cross section with the base at the bottom wall and is uniform along its length. The peak of the rib is not pointed but has a radius approaching a flat surface to increase the size of the spot at which the two ribs contact or engage. The rib structure alone is thus very strong even when formed of thin plastic material. The ribs are not solid but are hollow.

Each rib is centrally located on the bottom wall between the side walls. This serves well to maintain the desired spacing between the adhesive materials of the two facing traps where the flex strength of the bottom wall is weakest. Additionally as desired, intermediate spacer projections or mounds can be formed adjacent the side walls and equally spaced between the corner projections or mounds to space the adhesive materials of the two facing traps at points remote from the elongated angled spacer ribs of the invention.

BRIEF DESCRIPTION OF THE DRAWING

FIG. 1 is perspective view of two known vermin traps arranged side by side.

FIG. 2 is a median sectional view through the two known vermin traps arranged in facing relationship with forces being centrally applied thereto to bring into contact the adhesive materials thereof.

FIG. 3 is a perspective view of two vermin traps of the invention arranged side by side.

FIG. 4 is an exploded perspective view of the two vermin traps of FIG. 3 to be enclosed in a package bag.

FIG. 5 is a perspective view of a vermin trap in which a vermin has become entangled.

FIG. 6 is a plan view of two vermin traps arranged in facing relationship with one trap being in partial section;

FIG. 7 is a side sectional view of two vermin traps in facing relationship taken along the line 7—7 of FIG. 4 and in the direction indicated by the arrows;

FIG. 8 is a side sectional view of two vermin traps in facing relationship taken along the line 8—8 of FIG. 4 and in the direction indicated by the arrows; and FIG. 9 is a partial side sectional view of two vermin traps in facing relationship taken along the line 9—9 of FIG. 4 and in the direction indicated by the arrows.

DESCRIPTION OF THE PREFERRED EMBODIMENT

In FIGS. 1 and 2, the previously known vermin traps 10 and 40 shown therein each comprise an elongated, low tray or container 12 and 42 containing a layer of adhesive material 14 and 44.

Tray 12 has a bottom wall 16 and four side walls 18, 20, 22 and 24 upstanding at the periphery of bottom wall 16. Tray 12 also has four spacing mounds 26, 28, 30 and 32 arranged in the corners of tray 12. Mounds 28 and 32, arranged in opposite corners of tray 12, are cone shaped with a peak extending up from bottom wall 16 to above the top surface of the adhesive material 14. Mounds 26 and 30, also arranged in opposite corners of tray 12, extend upwardly from bottom wall 16 to above the top surface of adhesive material 14 and terminate in a cup-like structure.

Tray 42 likewise has bottom wall 46 and side walls 48, 50, 52 and 54 upstanding from the bottom wall at the periphery thereof. Tray 42 also has spacing mounds 56, 58, 60 and 62 arranged in the corners of the tray. Spacing mounds 58 and 62 are cone shaped with a peak extending upwardly from bottom wall 46 to above the top surface of adhesive material 44. Mounds 58 and 62 are in opposite corners of the tray. Spacing mounds 56 and 60, located in opposite corners of the tray 42, also extend upwardly from bottom wall 46 to above the top surface of adhesive material 44 and terminate in a cup-like structure.

Traps 10 and 40 thus form adhesive holding container having open top faces 34 and 64.

Referring to FIG. 2, the traps 10 and 40 typically are brought into face-to-face relationship for packaging, transport, storage and sale. For example, trap 40 can be rotated to be upside down. The upper peripheral edges or side walls of the trap engage against the like peripheral edges or the peripheral side walls of the other trap, and the spacing mounds of each trap engage with the spacing mounds of the other trap normally to space apart the adhesive materials 14 and 44 of each trap. This results in a free space 70 between the adhesive materials 14 and 44 within the two facing traps.

The problem that occurs with these known traps is that minimal forces applied centrally of the bottom walls by such an index finger 72 and a thumb 74 squeezing the bottom walls together during removal of the trays from the packaging to be described brings into engagement the pressure sensitive adhesive materials 14 and 44 of each trap. These materials stick to one another, and when the forces are released, there is an irregular and undesirable shifting of adhesive material from one trap to the other, negatively affecting the distribution of adhesive material in one or the other trap. The flexing or bending of the bottom walls is not prevented by the side walls or the spacing mounds, which are located peripherally of the tray bottom walls. The thinness of the tray bottom walls results in little rigidity in the areas central of each tray so that small forces can easily bring into contact the adhesive materials 14 and 44.

Structure shown in FIGS. 3 through 9 that is similar to that shown in FIGS. 1 and 2 is indicated by like reference numerals having a prefix numeral 1. Reference numerals 10 through 64 of FIG. 1 indicate structure respectively identified in FIG. 3 by references numerals 110 through 164. For example, side wall 24 in FIG. 1 corresponds to a similar side wall indicated by reference numeral 124 in FIG. 3.

Referring to FIG. 3, vermin traps 110 and 140 in addition to the structure substantially described earlier in reference to FIGS. 1 and 2, include spacing ribs 180, 182, 184 and 186. Tray 110 further includes a pair of cylindrical spacing mounds 190 and 192 while trap 140 includes a pair of cylindrical spacing mounds 194 and 196. The ribs and cylindrical spacing mounds extend upwardly from the bottom wall of each tray to above the top surface of the adhesive materials 114 and 144.

Ribs 180 through 186 serve to rigidify the central areas of the bottom walls of traps 110 and 140 and reduce the ability of the bottom walls to flex under normal forces applied thereto to bring into contact the adhesive materials. Additionally, the ribs are located so that when the trays are brought into face-to-face relationship, the ribs will engage against one another and positively space the adhesive materials of one tray from the adhesive material of the other.

Cylindrical spacing mounds 190 through 196 serve to space apart the bottom walls of the two traps in the areas adjacent to the side walls in between the earlier described spacing mounds in the corners of each tray.

Referring to FIG. 4, vermin trap 140 has been turned upside down and is placed in face-to-face relationship on top of trap 110. In this face-to-face relationship, traps 110 and 140 are slid into a packaging or package bag 200 together with a pair of sanitary cover boards 202 and 204. This forms a neat package that easily can be transported, stored and sold. In operation, one sanitary cover board is unfolded and is inserted into the open face of a vermin trap such as 110. The covered vermin trap 110 then is placed in any desired location at which the presence of vermin has been determined. A vermin such as a mouse 206 that steps on the adhesive material 114 of the trap becomes entangled therein and is unable to extricate himself. The entire trap 110 including cover board 202 then is disposed of as desired. Cover board 202 can be made of any desired material such as cardboard. Referring to FIG. 6, the ribs are arranged to be at about 45 degree angles with the side walls of each tray.

When the traps are brought into facing relationship, the ribs 180 and 184 engage against and cross each other and the ribs 182 and 186 engage against and cross each other at substantially right angles. The angular relationship of the ribs to the walls and to one another when in facing relationship are important to ensure contact under varying conditions. This contact maintains the adhesive materials in the two traps spaced from one another and out of contact to avoid the previously described problem.

The trays 112 and 142 can be made in identical molds. In any event, the molds are made to be as inexpensive as possible to minimize the cost of the tray. As such, there can be small dimensional differences in the mold structures forming the ribs 80, 82, 84 and 86. These differences include the height, size and in particular, the location of the ribs between the side walls. Arranging the alongated ribs at the selected 45 degree angle to the side walls ensures that ribs manufactured in the same or different molds always will engage and contact one another to maintain the desired spacing between the adhesive materials of the two traps.

The angle and lengths of the ribs additionally accommodate the trays being arranged in face-to-face relationship with their side walls and support cones substantially out of registration with one another while still maintaining the adhesive materials of the two traps spaced from one another. This mis-alignment can be present while the trays are in packaged condition or can be caused by a shifting of the trays while being removed from the packaging involved. Beyond the particulars of the molds used to make the tray of each trap, this improper registration is important because often the cone peaks and cup structures of the support mounds of the trays cannot exactly register with one another due to variations between molds. The ribs thus address the problem of improper registration and provide a solution not contemplated by previous structures. The location, arrangement and lengths of the ribs thus provides structure positively ensuring the spacing of the adhesive materials of the two traps from one another under a variety of shipping, storing and use conditions. The particular structure of the ribs further provides this positive spacing that could not otherwise be provided by simple support mounds.

In FIG. 6, rib 186 is also shown in dashed line outline to illustrate that even when substantially misaligned with underlying rib 182, engagement can still occur to maintain the spacing between the adhesive materials of the two traps.

Supplemental to the ribs 180, 182, 184 and 186, the trays additionally are provided with support mounds 190, 192, 194 and 196 located laterally of the trays 112 and 142 along the side walls thereof and between the other support mounds. Support mounds 190 through 196 have been determined to beneficial in addition to the ribs in maintaining the adhesive materials of the two traps spaced from one another.

In FIG. 7, the peaks of the support mounds 128 and 162 engage with the recesses of the cup structures of support mounds 160 and 126 respectively. This not only maintains the desired spacing between the trays or traps but also serves to prevent or minimize the possibility of lateral shifting of the traps relative to one another in their face-to-face relationship except under extreme mis-alignment conditions where the four sets of support mounds in the corners of each trap do not mate or exactly engage with one another to obtain the results shown in FIG. 7. While this result may be attained in some or part of the engagement of the corner support mounds, such engagement cannot always be depended upon because of the inexpensive manufacture of the trays. The ribs 180, 182, 184 and 186 ensure the desired spacing of the adhesive under even most extreme mis-alignment conditions. Central support mounds 192 and 194 desirably engage one another. In practice, the central support mounds 192 and 194 may be slightly offset from one another. In FIG. 8, the corner support mounds 126 and 128 engage with the corner support mounds 158 and 160 respectively. This again is the ideal situation where the peaks of the cones exactly engage with the cup structures of the mating support mound.

In FIG. 9, support rib 180 has side walls 210 and 212 upstanding angled inwardly from bottom wall 116 and terminating in a top wall 214. Side walls 210 and 212 and top wall 214 form a substantially triangular hollow cross section extending the length of rib 180 with the hollow 216 opening to below the bottom wall 116 of trap 110. The base of the triangle is at the bottom wall and the peak of the rib is flat as defined by top wall 214, to increase the size of the spot at which the ribs 180 and 184 contact or engage. The cross section of rib 180 is uniform along its length. Rib 184 has end walls 220 and 222 and top wall 224 forming a hollow 226 opening to above bottom wall 146 of trap 140. Top wall 214 of rib 180 and top wall 224 of rib 184 thus engage or contact against one another to effect the desired spacing feature. While the side walls, top walls and hollows of ribs 180 and 184 specifically are identified with reference numerals, all four of the ribs 180, 182, 184 and 186 include like structure not specifically identified for clarity of the drawing. The rib side walls, top walls and end walls are formed of the bottom wall material during a vacuum forming or other desired molding process. The geometric arrangement of the wall material contributes to its strength resulting in a positive means for resisting substantial compression forces between the two facing traps. Not only does the wall material of the rib structure provide sufficient support for the ribs themselves, but the ribs also strengthen the bottom walls against bending or flexure caused by forces applied thereto.

Variations of the embodiment described are possible while remaining within the invention claim hereafter. For example, the number, placement, angle and dimensions of the ribs can be varied to effect the desired spacing function. Additionally, centrally located support mounds can be added in locations as desired to supplement the spacing function of the ribs. Within the scope of the claims hereafter appended, the invention can be practices as desired.

I claim:

1. A trap for vermin adapted to be placed in facing relationship with another like trap in a package for storage, transport and sale, the trap comprising:
   A. a tray having a bottom wall and four main side walls upstanding from the periphery of the bottom wall to define an opening into the tray;
   B. a layer of vermin-trapping pressure sensitive adhesive material in said tray on said bottom wall, said layer having a top surface spaced below the top of said side walls; and
   C. at least one rib extending from said bottom wall to a level above said layer and substantially equal to the top of said side walls, said rib having a length greater than its width and being arranged angled to said side walls to engage against and cross a like rib of a similar trap having its open side confronting the open side of the trap here defined to prevent substantial compression of said bottom walls of said confronting traps.

2. The trap of claim 1 in which there are a plurality of said ribs in each tray which will engage against and cross like ribs in said confronting similar trap.

3. The trap of claim 1 in which said tray is rectangular, there are two ribs in each tray which will engage against and cross like ribs in said confronting similar trap and each of said ribs is centrally located in each half of said tray.

4. The trap of claim 1, 2 or 3 in which each of said ribs is arranged at substantially a 45 degree angle to said tray side walls.

5. The trap of claim 1, 2 or 3 in which each of said ribs is integral with said bottom wall.

6. The trap of claim 1 in which said rib is hollow and opens below said bottom wall.

7. The trap of claim 1 in which said rib has a uniform cross-sectional shape along its length.

8. The trap of claim 7 in which said cross-sectional shape of each rib is substantially triangular with the base thereof at the bottom wall and the apex extending above said layer.

9. The trap of claim 8 in which said apex is substantially rounded to increase the area adapted to engage said like rib.

10. The trap of claim 1 in which the side walls intersect at four corners and further includes a pair of support mounds extending from said bottom wall to above said layer of adhesive material, each support mound being located adjacent a side wall centrally between two adjacent corners.

11. A pair of substantially identical vermin traps intended to entangle vermin therein, each trap comprising:
 A. a tray having a main wall integral with four peripheral side walls defining an opening into said tray, the outer ends of said side walls being at a level spaced from said main wall, said tray being substantially rectangular with four corners;
 B. a layer of vermin-trapping pressure sensitive adhesive material in said tray on the inner side of said main wall, said layer having an outer surface spaced inside the level of the outer ends of said side walls; and
 C. spacing means integral with and extending from the inner side of said main wall in central regions thereof to a level substantially equal to the level of the outer ends of said side walls, said spacing means being at least one rib elongated and angled with respect to said side walls to engage against and cross a like rib of a similar trap having its open side confronting the open side of the trap here defined to prevent substantial compression of said main walls of said confronting traps, and said traps being in confronting relationship with said open sides thereof facing each other and said at least one rib of each tray contacting and crossing the corresponding rib of the other trap.

12. The trap of claim 11 wherein each of said trays also has four support mounds extending integrally from the inner side of said main wall to levels substantially equal with said level of the outer ends of said side walls, said mounds of each tray being in contact with one another, the contacting portions of said mounds being a projection of one mound fitting into a recess in the other mounds.

13. The traps of claim 11 in which said spacing means of each trap include two ribs each centrally located in one half of said tray.

14. The traps of claim 11 in which said spacing means of each trap are arranged with their elongate dimension at substantially a 45 degree angle to said side walls thereof.

15. The traps of claim 11 in which said spacing means of each trap are integral with said bottom wall.

16. The traps of claim 11 in which said spacing means of each trap are hollow, opening to the outside of said main wall thereof.

17. The traps of claim 11 in which said spacing means of each trap has a uniform cross-sectional shape along its length.

18. The traps of claim 17 in which said cross-sectional shape of each rib is substantially triangular, with the base thereof at the main wall and the apex extending beyond said layer.

19. The traps of claim 18 in which said apex of each rib is substantially rounded to increase the area adapted to engage said like rib.

20. The traps of claim 11 in which the spacing means of each trap include a pair of substantially cylindrical support mounds extending from said main wall to a position beyond said layer of adhesive material, each support mound being located adjacent a side wall centrally between two adjacent corners of the tray.

21. A vermin trap intended to entangle vermin therein, the trap adapted to be placed in registered facing relationship with another like trap in a package for storage, transport and sale, the trap comprising:
 A. a tray having a bottom wall integral with four peripheral side walls defining an opening into said tray, the top of said side walls being at a level above said bottom wall, said tray including four cylindrical support mounds extending integrally upwardly from said bottom wall to levels substantially equal with said level of the top of said side walls, said tray being substantially rectangular with four corners and each of said support mounds being located substantially at a corner of said tray, each support mound being adapted to engage against a like support mound in a like trap placed in a registered facing relationship with said trap;
 B. a layer of pressure sensitive adhesive material in said tray on said bottom wall, said layer having a top surface spaced below the level of the top of said side walls; and
 C. a pair of ribs integral with and extending upwardly from said bottom wall to substantially said level of the top of said side walls, each rib being elongate and hollow with the hollow opening to below the bottom wall, the ribs being angled relative to the side walls at substantially a 45 degree angle and having a uniform cross-sectional shape to engage against and cross a like rib of a similar trap having its open side confronting the open side of the trap here defined, each rib being centrally located in substantially one half of said tray positively to prevent substantial compression of said main walls of said confronting traps.

* * * * *